July 5, 1927.
A. E. WILSON
1,634,893
PURIFYING MECHANISM AND METHOD
Filed July 22, 1926
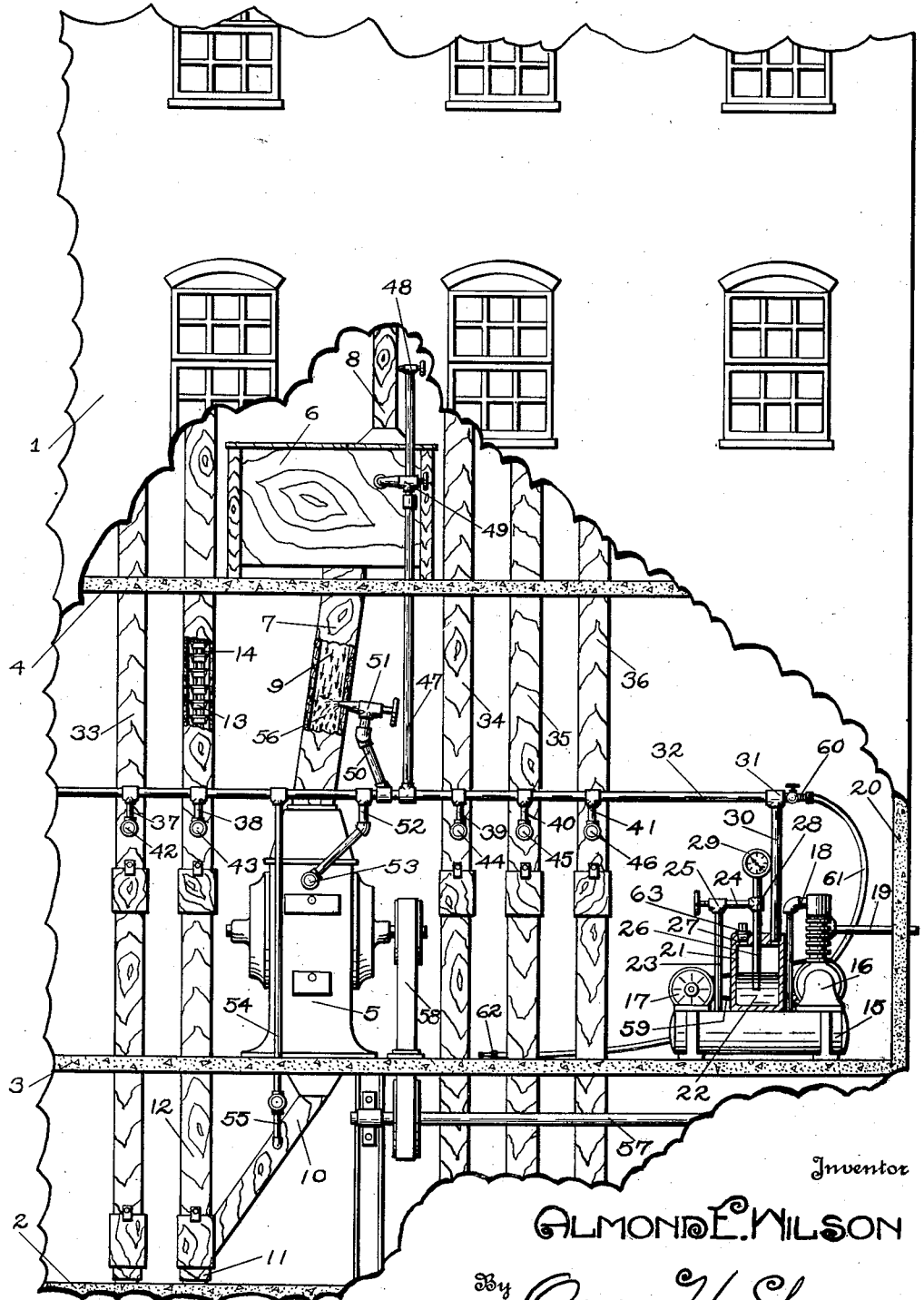
Inventor
ALMOND E. WILSON
By Owen H. Spencer
Attorney Patented July 5, 1927.

1,634,893

UNITED STATES PATENT OFFICE.

ALMOND E. WILSON, OF INDIANAPOLIS, INDIANA.

PURIFYING MECHANISM AND METHOD.

Application filed July 22, 1926. Serial No. 124,283.

My invention relates to a method and means of destroying insects which infest the mechanisms of grain mills and the like, and more particularly to method and means for eliminating and preventing insect life in grain mills by a nozzle applied insecticide; and consists substantially in the construction, combination and arrangement of parts hereinafter set forth and pointed out more particularly in the claims.

An object of my invention is to provide a method and means of positively spraying a vaporous insecticide thru the product and mechanisms of a grain mill.

It is a primary object of my invention to provide a method and means of spraying by artificial force a vaporous insecticide thru the product of a grain mill while the product is being manufactured and in motion thru such mill.

It is an object of my invention to provide an invention of this class which uses an insecticide harmless to the grain product but deadly to insect life.

It is also an object of my invention to provide in combination, a means of manufacturing and accumulating such insecticide under pressure as used in such mechanism.

It is a further object of my invention to combine in an invention of this class, a means of varying the rate of spraying and manufacturing the insecticide, as desired.

The above and other objects are attained by the structure illustrated in the accompanying drawing, in which the figure is a fragmentary sectional front view of a typical flour and grain mill.

Different characters of reference designate different parts thruout the drawing in which numeral 1 designates the main building structure of the grain mill, in which I arbitrarily choose to embody my invention. The numeral 2 designates the basement floor, numeral 3 the main floor, and numeral 4 the 2nd floor. Additional floors are also provided above the 2nd floor 4, as required and understood by those familiar with grain mills.

The numeral 5 designates one of the typical grain grinders which is conveniently located on the main floor 3. On the 2nd floor 4 approximately above the grinder 5 the conventional sifter machine 6 is also shown. Said sifter machine discharges into said grinder by way of the chute 7 said sifter machine being correspondingly fed by the chute 8 from other more upwardly disposed mill mechanisms (not shown), as understood by those familiar with the art. The product 9, will in process of manufacture pass from the sifter machine 6 thru the chute 7 to the grinder 5, said product being likewise supplied to said sifter machine in unsifted condition from above, by way of the chute 8. The product is discharged at a certain state of manufacture from the grinder 5 thru the chute 10 into the boot 11 of the chute 12, being then raised by the buckets 13 which are actuated by means of the belt chain 14, to raised said produce after it is thus discharged from said grinder, to said upwardly disposed mechanisms, (not shown) into which it is thus discharged. It is then conveyed downwardly thru different chute machines in the different floors of the mill, in conventional manner.

A means for producing the insecticide vapor as required, is conveniently carried out by providing a horizontal air tank 15, preferably located on the main floor 3. Upon said tank is mounted an air compressor 16, which is driven by the electrical motor 17. Said motor is fed by a source of electrical current (not illustrated) in the usual way. Said air compressor discharges into said tank by means of the conduit 18 and receives its intake preferably from the exterior of the grain mill by means of the conduit 19 which extends from said compressor thru the wall structure 20 to the exterior. A container 21 is also conveniently mounted on said air tank and is supplied with an insecticide producing fluid 22. Air is discharged from said tank thru the vertical conduit 23 which communicates with the horizontal conduit 24, by means of the angle valve 25. Air may be somewhat constantly supplied as desired to said container by means of the vertical conduit 26 which passes thru the cover wall 27 of said container in air tight manner. The lower extremity of said conduit is disposed below the level of the fluid 22 and the upper extremity is united with the horizontal conduit 24 by means of the T coupling 28 which communicates with and supports the pressure gauge means 29.

Leading from the upper interior of said container the vertical conduit 30 communicates thru the T coupling 31, with a horizontal conduit 32 which extends substantially across the grain mill as a whole in the proximity of the chain operated chutes 33, 12, 34, 35 and 36. Tributaries 37, 38, 39, 40 and 41, communicate with valve controlled nozzles 42, 43, 44, 45 and 46 respectively, which serve to discharge into said chain operated chutes, respectively. The tributary 47 communicates the horizontal conduit 32 with the nozzle valves 48 and 49, which serve to discharge into the chute 8 and sifter machine 6 respectively. The tributary 50 in like manner communicates with the valve controlled nozzle 51 which serves to discharge into the chute 7. The tributary 52 in like manner communicates the horizontal conduit 32 with the valve controlled nozzle 53 which serves to discharge into the grinder 5; and the tributary 54 communicates the valve controlled nozzle means 55 with said horizontal conduit, said nozzle means serving to discharge into the chute 10.

During the operation of the apparatus, air being kept supplied in the tank 15 by means of the air compressor 16, and the motor 17, the valve 25, is opened whereupon air is released from said tank. Air is thus caused to bubble from the lower extremity of the conduit 26, up thru the fluid 22, into the horizontal conduit 32 from whence it is conveyed to all of the aforesaid tributaries and thence to the respective ones of said nozzles, by which the vapor from said fluid is efficiently sprayed thru the product in the different mechanisms of the grain mill. Referring to the chute 7 which is shown in fragmentary sectional manner, the insecticide discharge 56 from the nozzle 51 is indicated by dotted arrows while the grain product 9 is indicated by means of the ordinary downwardly pointing arrows, it being obvious that the insecticide is thereby sprayed, somewhat transversely, thru said product. It will therefore be understood that the vaporous insecticide 56 is conveyed by compression to the different nozzles and sprayed therefrom interminglingly thru the product during the manufacture of same, while it is in motion thru the mechanism of such mill, as illustrated in chute 7. The product is thus manufactured and fumigated simultaneously.

It is understood that the insecticide fluid used is a known and definite liquid and although it is not injurious to such product, it is deadly to almost all insect life. It is therefore readily possible to eliminate all ordinary insect habitations by the use of same.

It is understood that the air compressor 16 need only run at such times as the air supply becomes exhausted in the tank 15, and the valve 25 serves to control the rate at which air is introduced thru the fluid 22, which accordingly controls the amount and rate of insecticide supplied vapor, thru the horizontal conduit 32 of such mill.

The grinder 5 is driven from the counter shaft means 57 by means of the conventional belt 58 which is mounted on said counter shaft means and said grinder 5.

The conventional flexible belt means 59 serves to transmit the driving power from the motor 17 to the compressor 16.

A suitable juncture 60 is provided in connection with the T coupling 31, for connecting a flexible service conduit 61, which is provided with a nozzle 62, by which the exposed surfaces of the different mill mechanisms may be subjected to the insecticide spray from the container 21, it being understood that such flexible conduit is manually manipulated, in substantially the same manner as a garden or fire hose.

The pressure gauge means 29 serves to show the amount of pressure per square inch within the container 21, the horizontal conduit 32 and its various tributaries, by which arrangement the operator will become readily familiar with the required compression necessary to efficiently actuate the aforesaid nozzles. The operator will also be able to conveniently ascertain the pressure per square inch of the air in the tank 15 by observing the gauge means 29 when the valve 25 is open, and thereby be able to ascertain when additional air is required in said tank to cause the proper spraying action at the various nozzles.

It is understood that the insecticide spray at the different nozzles may be selectively controlled as required in different parts of the mill as a whole, by individual regulation of the aforesaid valve controlled nozzles, or completely shut off at any nozzle as desired.

The insecticide producing fluid 22 is added as required to the container 21 by removal of the filling plug 63.

While I have illustrated in a general way, certain instrumentalities which may be employed in carrying my invention into effect, it is evident that many modifications may be made in the various details, without departing from the scope of the appended claims, it being understood that my invention is not restricted to particular forms, herein described.

I claim as my invention:

1. The method of treating grain as it is being converted into grist, consisting in injecting an insecticide into columns of the grist as it passes to and from and through a grist mill, for preventing insects, vermin and the like subsequently attacking and destroying the grist.

2. A method of treating grain prior to and during its conversion into a grist, consisting in injecting a constant flow of insecticide through columns of grain and grist as it approaches and leaves a grinding mill and also injecting a constant flow of insecticide through the product while passing through the mill, whereby insects or the like will be prevented from attacking and destroying the prepared grist.

3. A method of treating grain products prior to and during its conversion into a grist, comprising the introduction of an insecticide through the columns of grain and grist passing through the chutes leading to and from a grist mill, also into and through the grain product as it is passing through the grist mill, whereby insects or the like will be prevented from attacking and destroying the finished grist.

4. A method of treating grain products during its conversion to a grist, comprising the introduction of an insecticide into chutes employed in conveying the grain products to be converted into a grist to and from a grinding mill, and also through the product as it passes through the grinding mill, under mechanical force, whereby all particles of the grist will be thoroughly treated to prevent insects or the like attacking and destroying the finished product.

5. A method of treating grain products with a liquid insecticide during the conversion of the grain products to a grist, comprising the introduction of the insecticide into the chutes leading to and from a grinding mill and also into the grinding mill thus inoculating all particles of the grain product, whereby insects or the like will be prevented from attacking and destroying the finished product.

In testimony whereof, I have hereunto set my hand on this the 16th day of July, 1926, A. D.

ALMOND E. WILSON.